(12) United States Patent
Specht et al.

(10) Patent No.: US 6,439,493 B1
(45) Date of Patent: Aug. 27, 2002

(54) SEAT BELT RETRACTOR

(75) Inventors: Martin Specht, Feldafing (DE); Steve Marshall, Low Seaton (GB)

(73) Assignee: Breed Automotive Technology, Inc., Lakeland, FL (US)

( * ) Notice: Subject to any disclaimer, the term of this patent is extended or adjusted under 35 U.S.C. 154(b) by 0 days.

(21) Appl. No.: 09/460,597

(22) Filed: Dec. 14, 1999

(30) Foreign Application Priority Data

Apr. 16, 1999 (DE) .......................................... 199 17 362

(51) Int. Cl.[7] .............................................. B65H 75/48
(52) U.S. Cl. .................................. 242/379.1; 242/383.3
(58) Field of Search ........................... 242/379.1, 383.3, 242/383.4, 384.5, 384.6; 280/805, 806; 297/478

(56) References Cited

U.S. PATENT DOCUMENTS

| 3,970,265 A | * | 7/1976 | Kopke et al. ............. 242/107.4 |
| 3,979,083 A | * | 9/1976 | Fohl |
| 4,077,585 A | * | 3/1978 | Wiesbock ................. 242/383.3 |
| 4,560,115 A | * | 12/1985 | Toyama et al. ........... 242/383.1 |
| 5,372,328 A | * | 12/1994 | Haston et al. ............ 242/383.3 |
| 5,487,515 A | * | 1/1996 | Hishon et al. ............ 242/383.4 |
| 5,820,056 A | * | 10/1998 | Dybro et al. ................ 242/374 |
| 5,904,311 A | * | 5/1999 | Kielwein et al. ......... 242/383.2 |
| 5,954,287 A | | 9/1999 | Hirase |
| 6,283,398 B1 | | 9/2001 | Specht |

FOREIGN PATENT DOCUMENTS

| DE | 19640842 | | 4/1998 | | |
| DE | 19820641 | | 11/1998 | | |
| DE | 19758495 | | 2/1999 | | |
| GB | 2 326 851 A | * | 4/1997 | ........... B60R/22/34 |
| WO | WO 97/04996 | * | 2/1997 | ........... B60R/22/18 |

* cited by examiner

Primary Examiner—Donald P. Walsh
Assistant Examiner—Joseph C Rodriguez
(74) Attorney, Agent, or Firm—Lonnie Drayer; Jarett Rieger

(57) ABSTRACT

A seat belt retractor has a belt reel mounted rotatably on a frame for retracting and letting out the seat belt. A belt webbing and/or vehicle sensitive sensor activates a control element which in turn actuates a blocking device that blocks rotation of the belt reel. A load limiter allows a load-limiting rotation of the belt reel relative to at least one part of the load limiter when the blocking device is actuated. The blocking device can be guided by the load-limiting rotation of the belt reel into a permanent blocking position or readiness for the blocking position.

14 Claims, 4 Drawing Sheets

SEAT BELT RETRACTOR

FIELD OF THE INVENTION

The present invention relates to a seat belt retractor.

DISCUSSION OF THE PRIOR ART

DE 196 40 842 A1 teaches a seat belt retractor that comprises a belt reel mounted rotatably on a frame for retracting and uncoiling the seat belt, a blocking device for blocking the rotation of the belt reel, a control element for actuating the blocking device and a belt webbing and/or vehicle-sensitive sensor arrangement which activates actuation of the blocking device via the control element. The known seat belt retractor also comprises a load limiter which allows a load-limiting rotation of the belt reel relative to at least one part of the load limiter held by the blocking device when the blocking device is actuated.

SUMMARY OF THE INVENTION

The present invention ensures that, after operation of the load limiter, for example as a result of a crash, the blocking device is guided into a maintained blocking position or into readiness for a permanent blocking position. This is achieved in that the load-limiting rotation of the belt reel brings about this maintained blocking position or readiness for the blocking position of the blocking device. The readiness for continuous blocking of the belt reel can be achieved, in particular, by a permanently maintained pre-blocking state in which the control element is rotationally engaged with the belt reel. As a result of the continuous blocking of the belt reel, the seat belt retractor no longer has a winding function, at least in the belt extraction direction. This makes it clear to the user that load limitation has been implemented. The seat belt can optionally still be used as a "static belt", possibly for a workshop run. Blocking of the belt reel is maintained at least until the seat belt is released, removed and optionally wound in the direction of the parked position owing to the restoring force of the motive spring acting on the belt reel.

Advantageously, the blocking device can be moved into the permanent blocking position after a defined rotational angle of the load-limiting rotation of the belt reel. As a result, the windability of the belt reel is put out of operation only beyond a defined threshold or crash severity. The winding capacity of the belt reel is maintained in the event of a minor crash.

To maintain this permanent blocking position or readiness, the control element with which the blocking device is actuated can be held by a holding device which is actuated during the load-limiting rotation, in the position where the blocking device is brought into the blocking position by a short-stroke concomitant rotation in the belt extraction direction. The sensor arrangement which causes the control element to move into this position is fixed in a pre-blocking position by the holding device. Preferably, the belt webbing-sensitive part of the sensor arrangement is fixed in the pre-blocking position for this purpose. Relatively slight forces are sufficient to bring the holding device, by the load-limiting rotation of the belt reel, into the position in which the sensor arrangement and, in particular, the belt webbing-sensitive part of the sensor arrangement is fixed in the pre-blocking position. The belt webbing-sensitive mass of the sensor arrangement can thus be held in a position which brings about the blocking position of the blocking device.

The invention can be used in seat belt retractors with load limiters in which the load limiter produces the necessary load limitation or decelerating effect on extraction of the belt webbing during the load-limiting rotation of the belt reel owing to the consumption of energy, for example owing to deformation work as in a torsion bar or friction as in load limiters formed from plates or friction linings.

BRIEF DESCRIPTION OF THE DRAWINGS

The invention will be described in more detail hereinafter by way of an embodiment with reference to the drawings, in which.

DETAILED DESCRIPTION OF THE INVENTION

Figure 1:
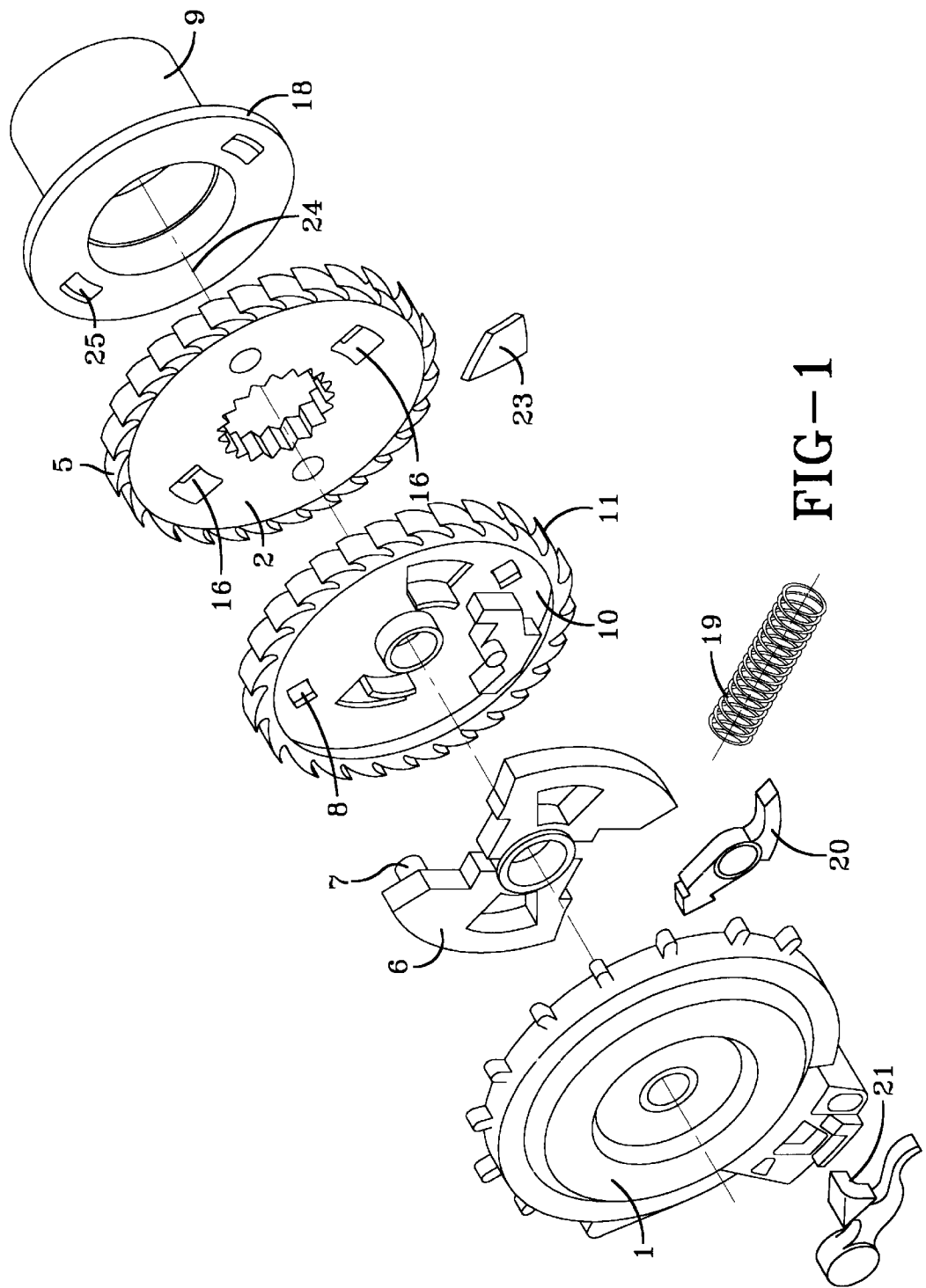
FIG. 1 is a perspective exploded view of a mechanical side of an embodiment of the seat belt retractor.

The figures show the mechanical side of an embodiment of a seat belt retractor in which the basic construction of the mechanical side containing the belt webbing-sensitive and vehicle-sensitive sensor arrangement has the design known from DE 197 58 495 A1. The mechanical side comprises a sensor carrier 10 that can be made of a plastic material. At the outer periphery of this sensor carrier 10 there are provided pre-blocking teeth 11 with which a vehicle-sensitive coupling element 21 can engage to bring about pre-blocking. The coupling element 21 is mounted on a control element 1 which has a cap-shaped configuration and surrounds the belt webbing-sensitive arrangement mounted on the sensor carrier 10 from the exterior.

The belt webbing-sensitive sensor arrangement comprises an inertial mass 6 that is mounted pivotally on the sensor carrier 10 against the force of a sensor spring 19. A coupling element 20 is also mounted pivotally on the sensor carrier 10. The mounting is described in detail in DE 197 58 495 A1. During excessive acceleration of belt webbing extraction, the coupling element 20 is actuated relative to the sensor carrier 10 owing to a relative rotation of the inertial mass 6 so the coupling element 20 is brought into engagement, by means of a pawl, with peripheral pre-blocking teeth located in the interior of the cap of the control element 1. The control element 1 is therefore coupled to the sensor carrier 10 connected non-rotatably to the belt reel 9 for concomitant rotation during extraction of the belt webbing. During excessive acceleration of the vehicle, the control element 1 is also coupled by the aforementioned coupling element 21 to the sensor carrier 10 connected non-rotatably to the belt reel 9. These two coupling states are belt webbing-sensitive and vehicle-sensitive pre-blocking states of the sensor arrangement (mechanical side) of the seat belt retractor. A mechanical side operating in this way is described in detail in, DE 197 58 495 A1.

If further webbing extraction and associated rotation of the belt reel 9 occurs in the pre-blocked state, the control element 1 coupled to this rotation is concomitantly rotated or pivoted so that a load-bearing blocking pawl 23 engages with the blocking teeth 5 of a blocking disc 2 rotating with the belt reel 9 during normal operation. The belt reel 9 is therefore blocked against further rotation and belt webbing extraction is stopped. A blocking pawl 23 which can be guided into the blocking teeth 5 in this way as shown schematically in FIG. 1.

The illustrated embodiment is also equipped with a load limiter. A load limiter part 4 connected non-rotatably to the blocking. disc 2 via a fixed bearing 3 is shown. The load limiter can be designed in the form of a torsion bar arranged coaxially to the reel axis 24. However, the load limiter can also be designed in the form of stacked friction discs or in the manner of a multiple disc clutch. Whereas one side or one end of the load limiter is connected non-rotatably or torsionally rigidly to the blocking disc 2 via the fixed bearing 3, as already explained, the other side or the other end of the load limiter is connected to the belt reel 9 or to a rotating reel part carrying the seat belt. The load limiter allows a decelerated or load-limiting rotation of the belt reel 9 or of the belt reel part on which the seat belt is coiled relative to the blocking disc 2 held by the blocking pawl 23, when the blocking disc 2 is blocked by the blocking pawl 23. The action of the load limiter thus allows decelerated extraction of belt webbing in a known manner so that the forces exerted on the vehicle occupant's body by the seat belt during a forward displacement of the vehicle occupant are kept within defined loading limits. The action of a load limiter of this type is known and is described, for example, in DE 196 40 842 A2 mentioned at the outset.

The illustrated embodiment is also designed in such a way that, on actuation of the load limiter, in particular above a defined loading threshold, the blocking device, i.e. the blocking engagement of the blocking pawl 23 in the blocking teeth 5 of the blocking disc 2, is maintained permanently. This permanent blocking position is brought about during the load-limiting rotation of the belt reel 9 or by the load-limiting rotation of the belt reel 9.

A holding device 13 in the form of a blocking wedge is provided on the sensor carrier 10 for this purpose. The holding device 13 projects through an orifice 16 in the blocking disc 2 and extends into a recess 25 provided at the face end in a reel flange 18 shaped rigidly on the belt reel 9. The recess 25 extends within a defined rotational angle or arc round the reel axis 24. The degree of this load limiting effect at which the permanent blocking position of the belt reel is to be maintained can be determined by this rotational angle. In the embodiment shown in FIG. 3, the recess 25 extends over a very small rotational angle so that rapid actuation of the holding device 13 is achieved.

Figure 3:
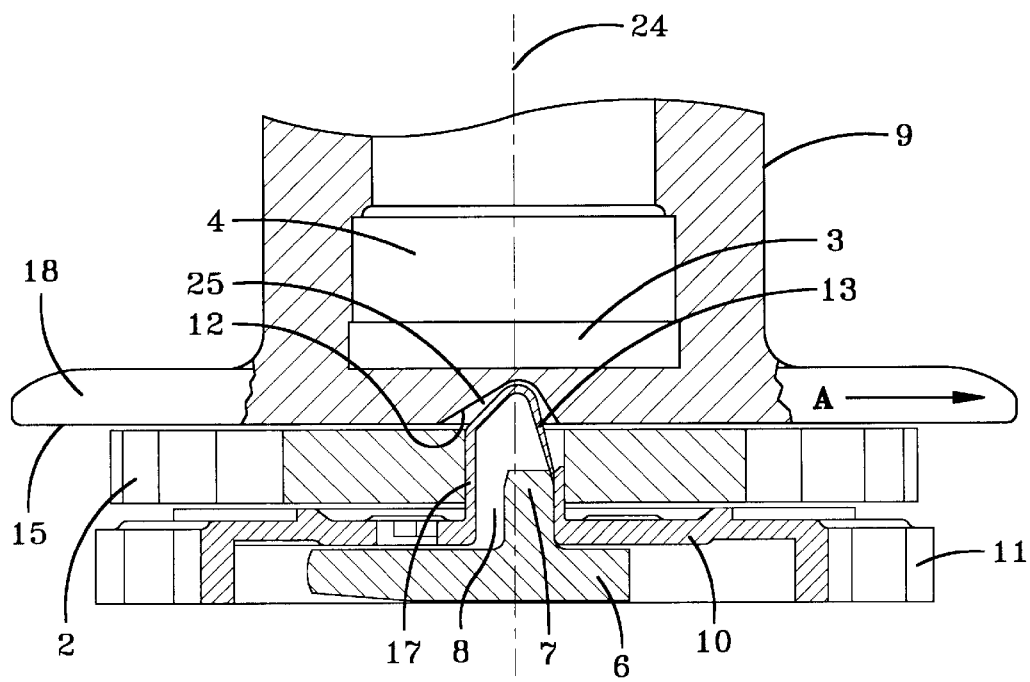
FIG. 3 is a part-sectional view of the assembled mechanical side of the embodiment in a first variation.
Figure 4:
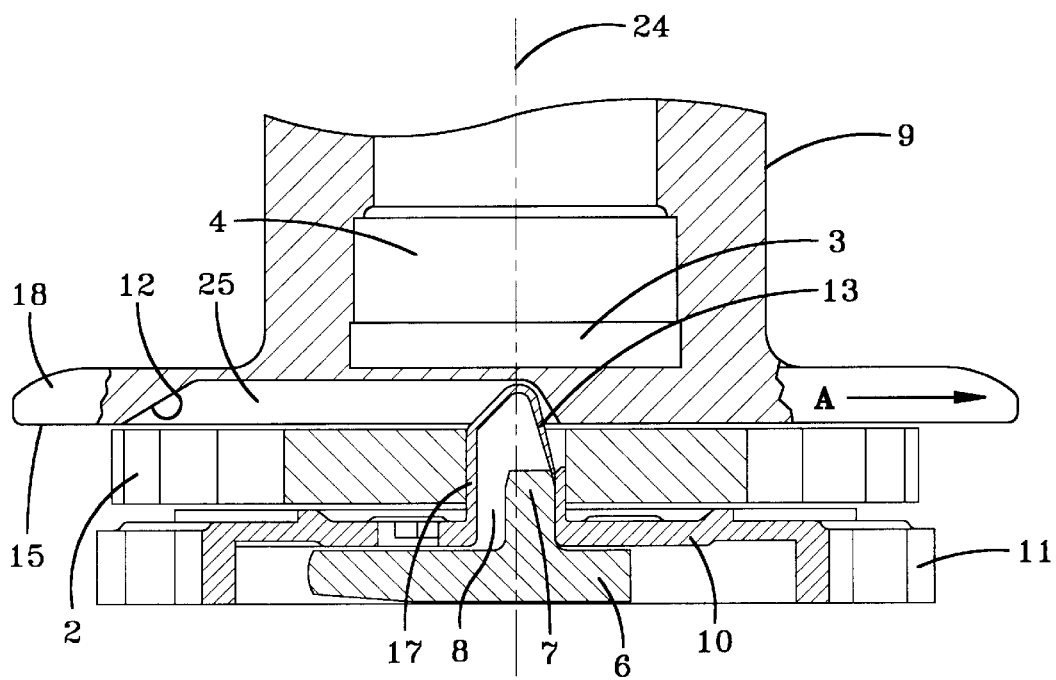
FIG. 4 is a view of the mechanical side as in FIG. 3 in a second variation of the embodiment.

In the embodiment shown in FIG. 4, the size of the rotational angle of the recess 25 is significantly greater. In the recess 25 is an actuating face 12 in the form of a wedge ramp that passes into a holding face 15 on the end face of the reel flange 18. In FIGS. 3 and 4, the holding device 13 is in the rest position in which the seat belt retractor operates normally.

Figure 2:
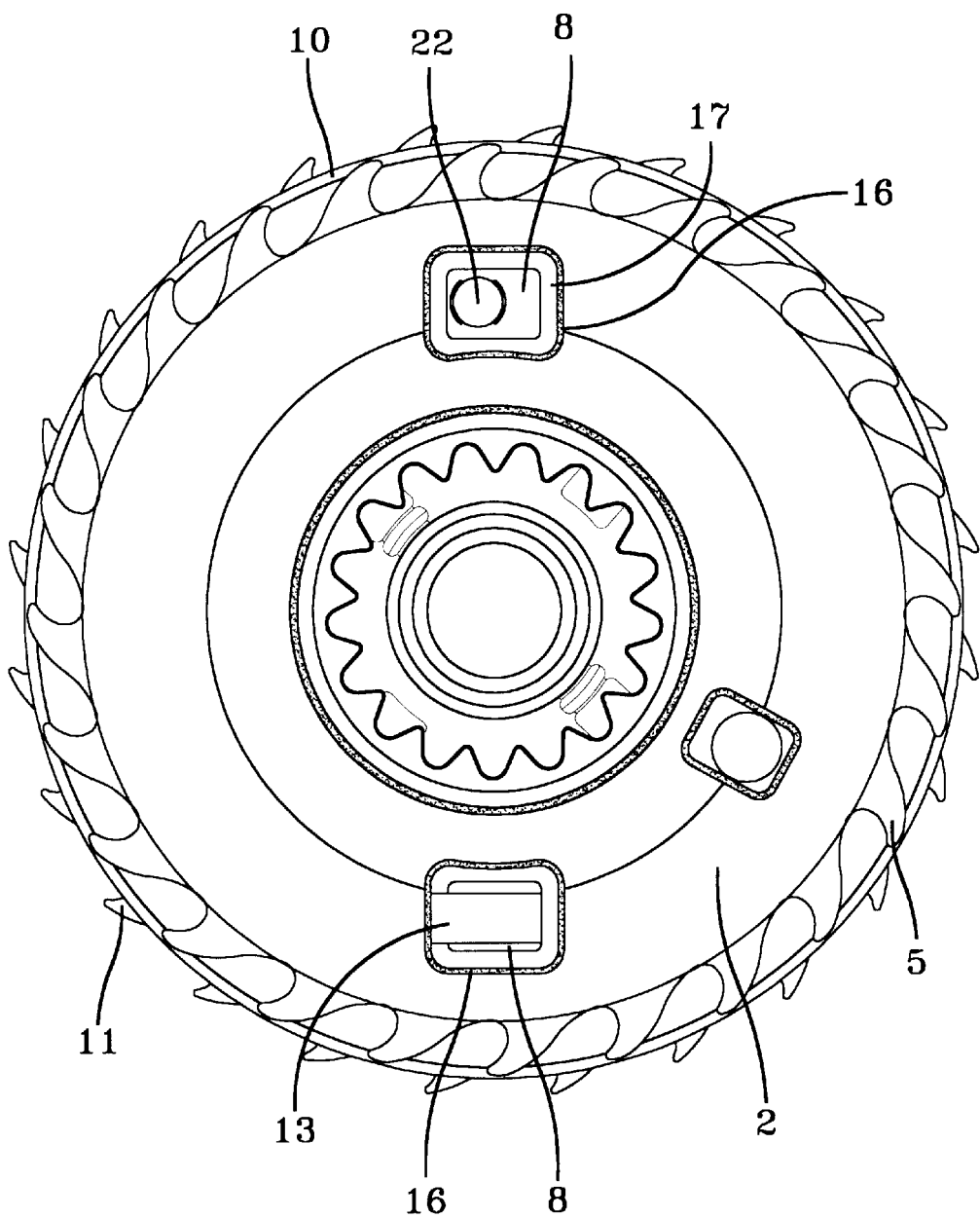
FIG. 2 is a view of the back of an arrangement which is formed by a sensor carrier and blocking disc and exists in the embodiment in FIG. 1.
Figure 5:
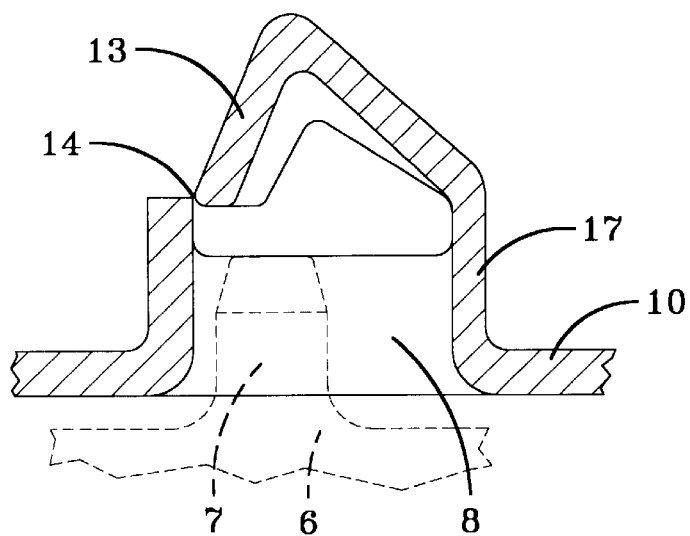
FIG. 5 shows an embodiment of a holding device in the rest position.

FIG. 5 is a detailed section of the holding device 13 in its rest position. The holding device 13 has a holding arm that is wedge-shaped at its external face and projects into the recess 25 with an at least partial interlocking fit in the rest position (FIGS. 3 and 4). In this rest position, the holding device 13 is held by a set breaking point 14 which produces a defined restraining force which has to be overcome in order to bring the holding device 13 out of the rest position into the fixing position shown in FIG. 6. In the embodiment illustrated, the holding device 13 is shaped pivotally on a shaft 17 on the sensor carrier 10 projecting through the orifice 16 in the blocking disc 2. As shown in FIG. 2, two such shafts 17 can be provided which project with an interlocking fit through corresponding orifices 16. The rotational connection between the belt reel 9 and the sensor carrier 10 is therefore ensured during normal operation of the seat belt retractor.

Pegs 7, 22 extend from the sensor mass 6. During normal operation, these pegs act as stop pegs for limiting the relative rotation of the sensor mass 6 relative to the sensor carrier 10. Of these pegs, one peg has the additional function of a blocking peg 7 which interacts with the holding device 13 in such a way that, after actuation of the load limiter, by the blocking pawl 23 and the blocking disc 2 forming the blocking device are held in their blocking position, as will be explained hereinafter.

In the event of a crash, optionally after retightening of the seat belt by means of a belt tightener (not shown in detail), the blocking pawl 23 is brought into blocking engagement with the blocking teeth 5 of the blocking disc 2. This control of the blocking device into its blocking position occurs after belt webbing-sensitive and/or vehicle-sensitive pre-blocking has taken place, as described above. During activation of pre-blocking, the blocking peg 7 shaped on the inertial mass 6 is brought from the right-hand rest position as shown in the orifice in the shaft 17 into the left-hand position in the illustrations in FIGS. 3 and 4, so that it rests on the left-hand side of the shaft 17. In the illustration in FIG. 6, which is a mirror image of the illustrations in FIGS. 3 and 4, the blocking peg 7 is brought from its left-hand position which it adopts in the rest position (FIG. 5) into the right-hand position, so that it rests on the right-hand internal side of the shaft 17 in the orifice 8. The blocking peg 7 maintains this position during blocking engagement of the blocking pawl 23 in the blocking teeth 5.

Figure 6:
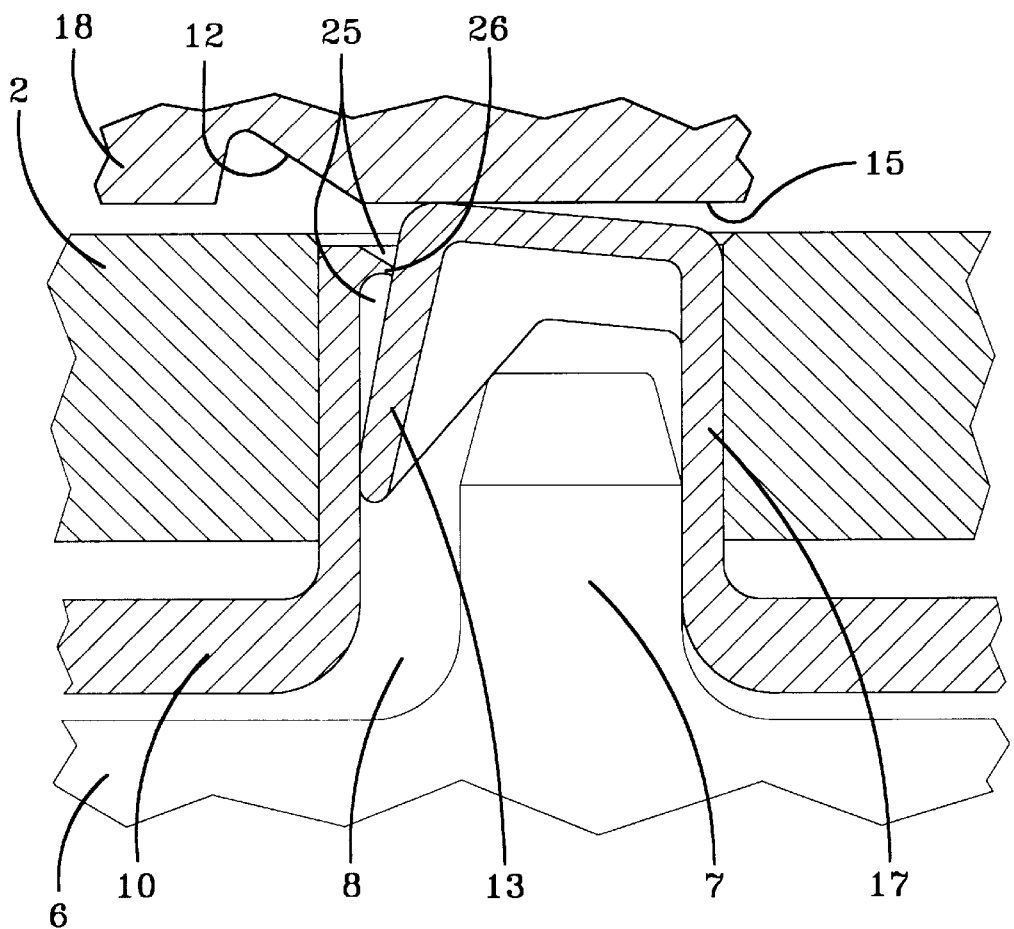
FIG. 6 shows the holding device in the fixing position.

If the severity of the crash exceeds a defined threshold and the body of the strapped-in vehicle occupant has endeavoured to make a forward movement with defined acceleration intercepted by the seat belt, operation of the load limiter is activated. The load limiter causes absorption of energy or consumption of energy; allowing belt webbing extraction that is decelerated or which limits the load for the strapped-in vehicle occupant. In the process, the belt reel 9 and the spool flange 18 shaped thereon rotates in the direction of an arrow A in FIGS. 3 and 4 and the mirror-image illustration in FIG. 6. The holding device 13 is moved substantially in the axial direction of the reel axis 24 into the space, vacated during pre-blocking, between the blocking peg 7 and the internal wall of the shaft 17 by the oblique ramp of the actuating face 12 and is wedged between the internal wall of the shaft 17 and the blocking peg 7, as shown in FIG. 6. During this movement, the restraining force ensured by the set breaking point 14 is overcome, so that the movement into the fixing position shown in FIG. 6 is achieved. During rotation of the belt reel while the load limiter is in action, the exterior of the holding device 13 comes into contact with the holding face 15. Once the decelerated relative rotation of the belt reel with respect to the blocking disc 2 has come to a standstill, the holding device 13 is held in the fixing position shown in FIG. 6 by the action of the holding face 15. In the process, the arm with the shaped-on holding wedge of the holding device, as shown in FIG. 6, is pressed into the space between the interior of the shaft 17 and the blocking peg 7. This fixed pre-blocking position of the belt webbing-sensitive part of the sensor arrangement is maintained permanently.

In the embodiment shown in FIGS. 3 and 6, the holding device 3 is moved into the fixing position immediately after the load limiting function begins. In the embodiment shown in FIG. 4, this movement takes place after the belt reel 9 has passed through a defined rotational angle corresponding to the arc length of the recess 25 when the rotational movement is decelerated. The holding device 13 does not come into contact with the oblique ramp of the actuating face 12 until then. A defined threshold for the severity of the crash can therefore be established, at which the holding device and therefore the permanent blocking position of the blocking device is brought about.

Advantageously, permanent maintenance of the pre-blocking, in particular a pre-blocking position of the belt webbing-sensitive part of the sensor arrangement, can be achieved after the load limiting function according to the invention. This allows the strapped-in vehicle occupant to unstrap himself by opening the belt buckle, the seat belt being retracted onto the belt reel 9 owing to the restoring force of the motive spring (not shown in detail). However, it is no longer possible to extract the belt webbing because, owing to the permanently maintained pre-blocking during a short-stroke extraction movement of the seat belt, the control element 1 guides the main blocking pawl 23 back into the blocking teeth 5 of the blocking disc 2 owing to the maintained pre-blocking. It is thus indicated to the vehicle occupant that checking of the belt retractor in the workshop is required.

On the holding device 13 and, in particular, on the part of the holding device 31 which is inserted in the cavity of the shaft 17 on the sensor carrier 10 in the fixing position shown in FIG. 6, comprises, on its exterior, catch projections 25 in the form of catch teeth which come into engagement with a catch nose 26 shaped on the upper edge of the shaft 17. This ensures that even during a load-limiting rotation of the belt reel comprising several rotations at the end of the load-limiting rotation, the holding device 13 remains in its fixing position (FIG. 6). This is regardless of whether the recess 25 or the holding face 15 is located at the site of the holding device 13 at the end of the load-limiting rotation. One or more catch teeth 25 can be provided for this purpose. Two catch projections 25 are provided in the embodiment illustrated. The catch nose 25 can be a shaped-on part forming the set breaking point 14, the catch nose 26 being formed when the set breaking point is broken during actuation of the holding device 13.

Many changes and modifications in the above-described embodiments of the invention can, of course, be carried out without departing from the scope thereof. Accordingly, that scope is intended to be limited only by the scope of the appended claims.

We claim:

1. A seat belt retractor comprising
   a belt reel mounted rotatably on a frame for retracting and uncoiling the seat belt,
   a blocking device for blocking rotation of the belt reel, said blocking device including a blocking disc,
   a control element for actuating the blocking device,
   a belt webbing- and/or vehicle-sensitive sensor arrangement which activates actuation of the blocking device via the control element,
   a load limiter which allows a load-limiting rotation of the belt reel relative to at least one part of the load limiter held by the blocking device when the blocking device is actuated, wherein the blocking device is guided by the load-limiting rotation of the belt reel into a permanent blocking position or permanent readiness for the blocking position so that rotation of the belt reel is blocked at least in the belt extraction direction, and
   a holding device for bringing about the blocking position of the blocking device, the holding device is moved, by the load-limiting rotation of the belt reel,
   from a rest position during normal operation into a fixing position, wherein the holding device is brought into the fixing position by a movement running substantially parallel to a belt reel axis, wherein the holding device projects through an orifice in the blocking disc.

2. The seat belt retractor according to claim 1 wherein the permanent blocking position of the blocking device is cancelled in the belt take-up direction by releasing the seat belt from a strapped-in position.

3. The seat belt retractor according to claim 1 wherein the control element remains held rotationally engaged with the belt reel by the holding device that is actuated during the load-limiting rotation.

4. The seat belt retractor according to claim 1 wherein the sensor arrangement is fixed in a pre-blocking position by the holding device.

5. The seat belt retractor according to claim 1 wherein the belt webbing-sensitive part of the sensor arrangement is fixed in a pre-blocking position.

6. The seat belt retractor according to claim 1 wherein a belt webbing-sensitive inertial mass of the sensor arrangement is held, by the load-limiting rotation of the belt reel in a pre-blocking position which brings about the blocking position of the blocking device.

7. The seat belt retractor according to claim 1 wherein the belt reel part onto which the seat belt is coiled is rotated, during the load-limiting rotation of the belt reel, relative to a blocking disc which is held by a blocking device and to which the held part of the load limiter is rigidly connected and in that the holding device moves into the fixing position by an actuating face provided on the rotated part of the belt reel.

8. The seat belt retractor according to claim 1 wherein the holding device is movably mounted on a sensor carrier for the belt webbing-sensitive inertial mass.

9. The seat belt retractor according to claim 1, wherein the blocking device is guided into the permanent blocking position after a defined rotational angle of the load-limiting rotation.

10. The seat belt retractor according to claim 8 wherein the holding device is locked in its fixing position on a sensor carrier.

11. The seat belt retractor according to claim 10 wherein the holding device is provided with at least one catch projection which is locked on the sensor carrier.

12. The seat belt retractor according to claim 1 wherein the holding device is movable against a restraining force.

13. The seat belt retractor according to claim 12 wherein the restraining force is formed by a set breaking point.

14. The seat belt retractor according to claim 12 wherein the holding device is shaped on the sensor carrier and is moved into the fixing position after overcoming the restraining force.

* * * * *